(12) United States Patent
Chu (10) Patent No.: US 10,679,336 B2
(45) Date of Patent: Jun. 9, 2020

(54) DETECTING METHOD, DETECTING APPARATUS, AND COMPUTER READABLE STORAGE MEDIUM

(71) Applicant: Samsung Electronics Co., Ltd., Suwon-si (KR)

(72) Inventor: Hyun Ho Chu, Hwaseong-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 133 days.

(21) Appl. No.: 16/104,207

(22) Filed: Aug. 17, 2018

(65) Prior Publication Data

US 2019/0228523 A1    Jul. 25, 2019

(30) Foreign Application Priority Data

Jan. 25, 2018    (KR) .......................... 10-2018-0009160

(51) Int. Cl.
*G06K 9/00* (2006.01)
*G06T 7/00* (2017.01)
(Continued)

(52) U.S. Cl.
CPC .............. *G06T 7/0008* (2013.01); *G06K 9/40* (2013.01); *G06K 9/48* (2013.01); *G06T 7/0004* (2013.01);
(Continued)

(58) Field of Classification Search
CPC ....... H01L 22/12; G01N 21/9501; G03F 1/38; G03F 1/42; G03F 1/44; G06T 7/70;
(Continued)

(56) References Cited

U.S. PATENT DOCUMENTS 4,972,493 A * 11/1990 Chemaly ................ B07C 5/342
382/149
8,596,541 B2    12/2013 Chiu et al.
(Continued)

FOREIGN PATENT DOCUMENTS

JP    2001-284422 A    10/2001
JP    2008-209134 A    9/2008
(Continued)

OTHER PUBLICATIONS

Samad, et al., "Design of Crack Detection System Software for IC Package Using Blob Analysis and Neural Network", ICS'05 Proceedings of the 9th WSEAS International Conference on Systems, 2005.

*Primary Examiner* — Duy M Dang
(74) *Attorney, Agent, or Firm* — Muir Patent Law, PLLC (57) ABSTRACT

A detecting apparatus includes an image processor configured to detect a crack in a semiconductor chip through image processing of an input image of the semiconductor chip, and a result outputting unit configured to output results detected by the image processor. The image processor is configured to perform an image gradient analysis on the input image, to convert the input image into a binary image by image binarization, based on a result obtained by performing the image gradient, to fill a closed region in the binary image with the same color as a color representing an outline of a shape appearing in the binary image that forms the closed region, to extract a shape having a predetermined property from the binary image, and to detect the crack by removing a shape connected to an edge portion of the input image. The result outputting unit is configured to output a resulting image in which a crack portion is expressed in the input image.

20 Claims, 6 Drawing Sheets

(51) Int. Cl.
*G06K 9/48* (2006.01)
*G06K 9/40* (2006.01)
*G06K 9/46* (2006.01)

(52) U.S. Cl.
CPC ............... *G06K 2009/4666* (2013.01); *G06K 2009/485* (2013.01); *G06T 2207/30148* (2013.01)

(58) Field of Classification Search
CPC . G06T 2207/30148; G06T 2207/30164; G06T 7/0008; G06T 7/0004; B23Q 17/2452; B23Q 17/2457; B23Q 17/2471; B23Q 17/249; G05B 2219/31432; G05B 2219/36251; G05B 2219/37555; G05B 2219/37578; G05B 2219/50064; G06K 9/40; G06K 9/48
USPC ........................................................ 328/149
See application file for complete search history.

(56) References Cited

U.S. PATENT DOCUMENTS

| 9,646,897 | B2 | 5/2017 | Sanchez et al. |
| 2003/0149947 | A1* | 8/2003 | Sarig ..................... G03F 1/84 |
| | | | 382/144 |
| 2004/0257560 | A1 | 12/2004 | Shibata et al. |
| 2016/0189369 | A1 | 6/2016 | Jung et al. |
| 2016/0336241 | A1 | 11/2016 | Bishop et al. |

FOREIGN PATENT DOCUMENTS

| JP | 2009-145285 A | 7/2009 |
| JP | 2009-198290 A | 9/2009 |
| KR | 10-1717768 B2 | 3/2017 |

\* cited by examiner

DETECTING METHOD, DETECTING APPARATUS, AND COMPUTER READABLE STORAGE MEDIUM

CROSS-REFERENCE TO RELATED APPLICATION

This application claims benefit of priority under 35 U.S.C. § 119 to Korean Patent Application No. 10-2018-0009160 filed on Jan. 25, 2018 in the Korean Intellectual Property Office, the disclosure of which is incorporated herein by reference in its entirety.

BACKGROUND

1. Field

Example embodiments according to the present inventive concept relate to a detecting method, a detecting apparatus, and a computer readable storage medium, more particularly a detecting method, a detecting apparatus, and computer readable storage medium for detecting crack(s) in a semiconductor chip that may occur during a semiconductor process.

2. Description of Related Art

In a semiconductor manufacturing process, crack(s) may occur in a semiconductor chip due to the presence of stress during cutting, mounting, or heating. Further, foreign objects may also be attached to a semiconductor chip.

There is a need to detect such a crack in, or foreign objects on, a semiconductor chip.

SUMMARY

An aspect of the present inventive concept is to provide a detecting method, a detecting apparatus, and a computer readable storage medium, capable of detecting a crack that has occurred in a semiconductor chip, or foreign objects attached to a semiconductor chip, in a semiconductor manufacturing process.

According to an aspect of the present inventive concept, a detecting apparatus includes an image processor configured to detect a crack in a semiconductor chip through image processing of an input image of the semiconductor chip, and a result outputting unit configured to output results detected by the image processor, wherein the image processor is configured to perform an image gradient analysis on the input image, to convert the input image into a binary image by image binarization, based on a result obtained by performing the image gradient, to fill a closed region in the binary image with the same color as a color representing an outline of a shape appearing in the binary image that forms the closed region, to extract a shape having a predetermined property from the binary image, and to detect the crack by removing a shape connected to an edge portion of the input image.

According to an aspect of the present inventive concept, a detecting method performed by an image processor to detect a crack in a semiconductor chip includes: performing an image gradient analysis on an input image of the semiconductor chip; converting the input image into a binary image by image binarization, based on results of the image gradient; filling a closed region in the binary image with the same color as a color representing an outline of a shape appearing in the binary image that forms the closed region; extracting a shape having a predetermined property from the binary image; and removing a shape connected to an edge portion of the input image.

According to an aspect of the present inventive concept, a non-transitory computer readable storage medium, recorded with instructions executable by a processor to perform a detecting method to detect a crack in a semiconductor chip is disclosed. The detecting method includes: performing an image gradient analysis on an input image of a semiconductor chip; converting the input image into a binary image by image binarization, based on results of the image gradient; filling a closed region in the binary image with the same color as a color representing an outline of a shape appearing in the binary image that forms the closed region; extracting a shape having a predetermined property from the binary image; and removing a shape connected to an edge portion of the input image.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
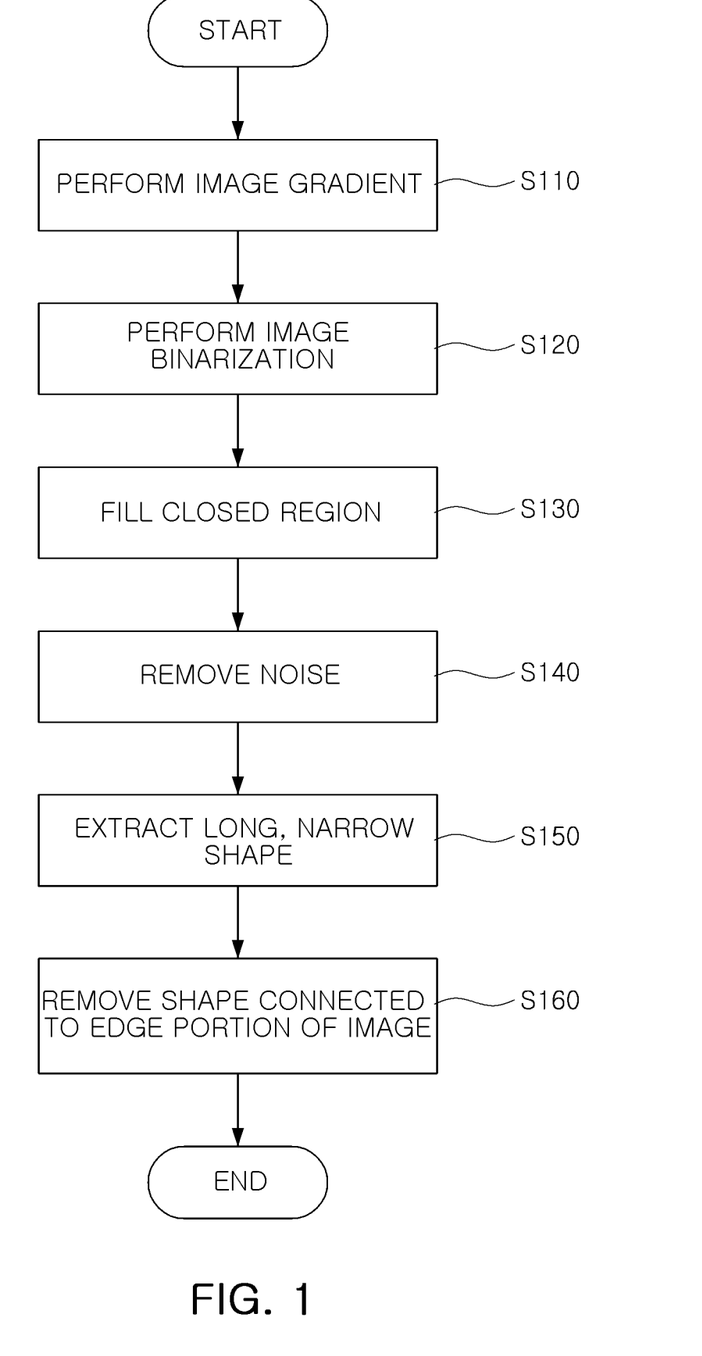
FIG. 1 is a flowchart of a detecting method according to an example embodiment of the present inventive concept.

FIG. 1 is a flowchart of a detecting method according to an example embodiment.

Referring to FIG. 1, in step S110, an image gradient analysis may be performed on a captured image of a semiconductor chip to be detected for determining presence or absence of crack(s).

According to exemplary embodiments, the image gradient refers to quantification of a degree of color change (which may be a grayscale color change) in the image.

For example, a degree of color change over an entire area of the image may be represented numerically, and a portion of the image in which the color gradually changes may have a relatively low numerical value, while a portion of the image in which the color rapidly changes may have a relatively high numerical value. Image processing techniques for determining comparative degrees of gradation are known and may be used to perform this step.

Thereafter, image binarization may be performed based on results of performing the image gradient on the image in S120.

For example, the numerical value obtained by quantifying a degree of color change in the image may be compared with a predetermined value, and the image may be converted into a binary image by comparison results.

For example, when the quantified numerical value is equal to or greater than the predetermined value, the image may be converted into a binary image represented by white, otherwise the image may be converted into a binary image represented by black.

In the converted binary image described above, an outline of an object (e.g., a solder ball), a crack, foreign objects, or the like on the semiconductor chip may be expressed in white.

Thereafter, a closed region may be filled in the binary image in S130.

For example, in a case in which a shape appearing in the binary image forms a closed region, the interior thereof may be filled with the same color as a color representing an outline of the shape, for example, white. Various image processing techniques for detecting closed shapes and filling them in are known and may be used to perform these steps.

As a result, the object, cracks, foreign objects, or the like on the semiconductor chip may be expressed as white relatively more clearly.

Thereafter, noise may be removed from the binary image in S140.

For example, shapes in the binary image, having areas smaller than a predetermined area, may be removed. For example, a known image detection algorithm may detect objects having a size (e.g., area) smaller than a particular value and those detected objects may be removed.

Subsequently, a predetermined shape, for example, a long, narrow shape may be extracted from the binary image from which noise has been removed, in S150.

According to example embodiments, lengths and widths of each of shapes, remaining after noise is removed from the binary image, may be obtained. For example, the length indicates a distance in a longest direction of the shape, while the width indicates an average distance in a perpendicular to the longest direction of the shape.

Then, by extracting only a shape having a length/width ratio equal to or greater than a predetermined value, shapes having a length larger than a width thereof may be extracted. In addition, a required shape, for example, a long, narrow shape, may be extracted by extracting only shapes of which the width is included in a predetermined range for the extracted shapes.

Thereafter, a shape connected to an edge portion of the image may be removed in S160.

Figure 2:
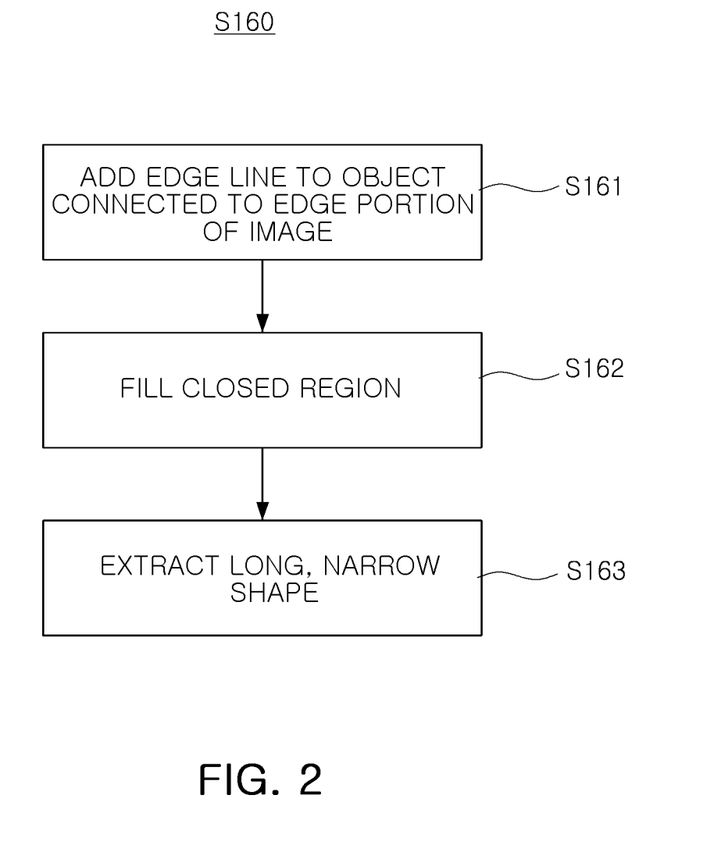
FIG. 2 is a detailed flowchart of operation S160 illustrated in FIG. 1.

FIG. 2 is a detailed flowchart of operation S160 shown in FIG. 1. Referring to FIG. 2, according to an example embodiment, an edge line may be added to the shape connected to the edge portion of the image with the same color as that of a contour of the shape, for example, white, in S161, and the closed region may be filled in S162, in the same manner as in operations S130 and S150 above, and the long, narrow shape may be extracted in S163 to remove the shape connected to the edge portion of the image.

In a final image after the above-described operations, an object to be extracted may be represented by white, and, thereby, a crack, foreign objects, or the like on the semiconductor chip may be detected.

According to an example embodiment, set values that are the basis of comparison in the above-described operations may be respectively determined by user input.

According to another example embodiment, predetermined values may be used, depending on a condition of an input image including the type of the input image, the resolution, the brightness thereof and the like, or the type of the object to be detected.

For example, when a crack is intended to be detected by the above-described detecting method with reference to FIG. 1, since the crack generally has a long, narrow shape, the crack may be detected more accurately by adjusting the set value and range in operation S150 described above, depending on the properties of the crack.

Such a set value will be described later in detail with reference to FIG. 4.

The detecting method described above with reference to FIG. 1 may be implemented by, for example, an image processor, an image processing tool, or the like, which are capable of image processing.

On the other hand, according to an example embodiment, a non-transitory computer readable storage medium in which instructions are executable by a processor for performing the respective operations of the detecting method as shown in FIG. 1 may be provided. In either case, in some embodiments, while certain parameters can be set by a user, some or all of the processing steps and algorithms of FIG. 1 can only be performed by a computer and automated technology, and such processes cannot be performed in the abstract by a person because they require computer image processing technology as well as the use of high-powered cameras and/or microscopes.

FIGS. 3A to 3E provide figures illustrating an example of a process of detecting a crack according to an example embodiment, in which a crack that has occurred in peripheral portions of solder balls is detected by a detecting method according to an example embodiment.

Figure 3A:
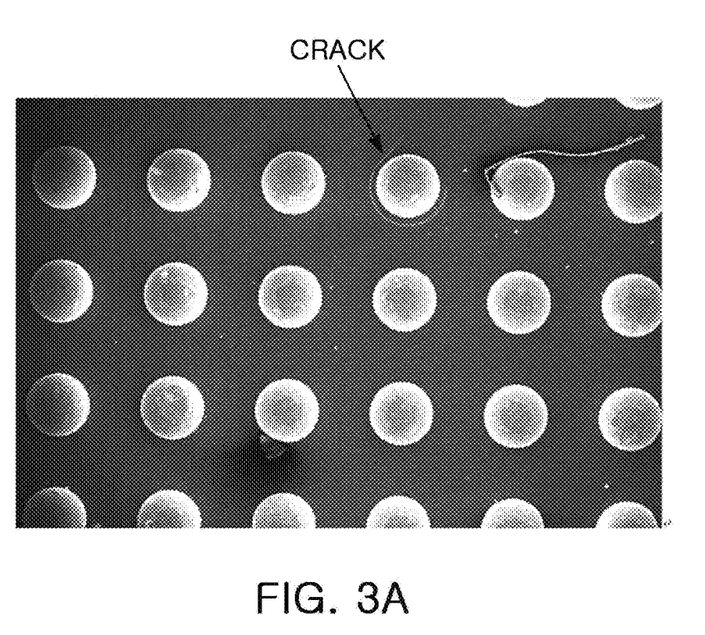
FIGS. 3A to 3E provide figures illustrating an example of a process of detecting a crack according to an example embodiment of the present inventive concept.

FIG. 3A shows an input image provided by imaging a semiconductor chip to be detected.

In FIG. 3A, it can be seen that a crack occurred in the peripheral portion of the solder ball located $3^{rd}$ from the right and in the top portion.

Figure 3B:
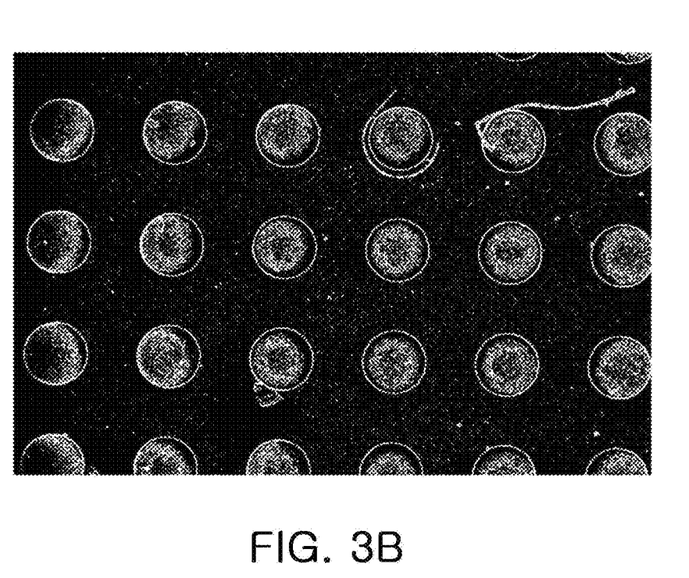

FIG. 3B shows the results of performing image gradient analysis S110 and image binarization S120 for the input image, as shown in FIG. 1, for example, a binary image.

In FIG. 3B, it can be seen that outlines of solder balls, a crack, foreign objects, or the like for the semiconductor chip are shown in white.

Figure 3C:
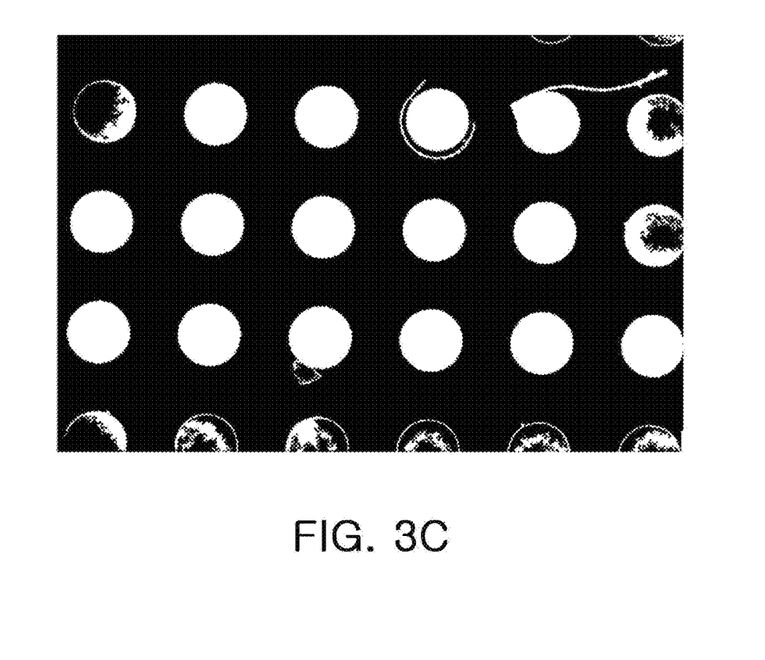

FIG. 3C shows the results of performing the fill of closed region (S130) and the removal of noise (S140), as shown in FIG. 1, for the binary image.

In FIG. 3C, it can be seen that solder balls, a crack, foreign objects, or the like are clearly expressed in white. However, in the case of the solder balls connected to the edge portions of the image, it can be confirmed that the insides of the solder balls are not filled, since closed regions are not formed.

Figure 3D:
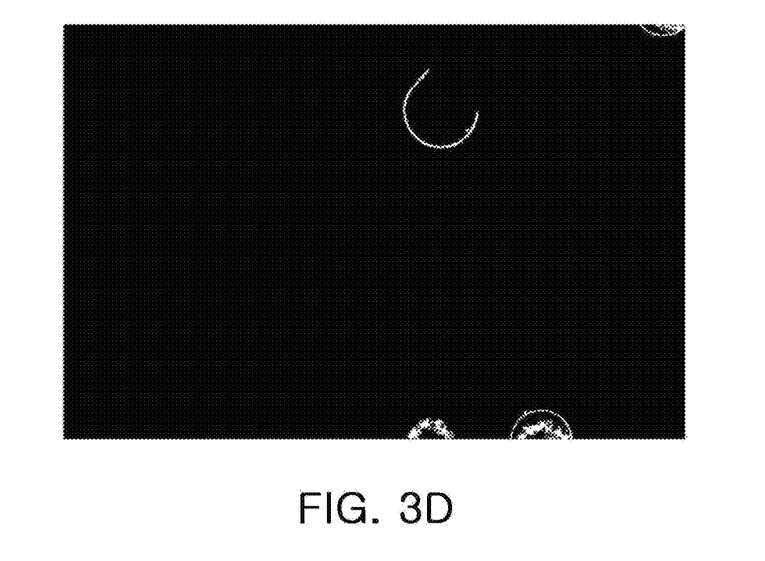

FIG. 3D shows the results of performing the extraction of the long, narrow shape (S150) in FIG. 1, with respect to the binary image from which noise has been removed.

In FIG. 3D, it can be seen that the crack occurred in a peripheral portion of the solder balls is expressed in white, and in this case, the solder balls of which insides are not filled as shown in FIG. 3C, may be also extracted together.

Figure 3E:
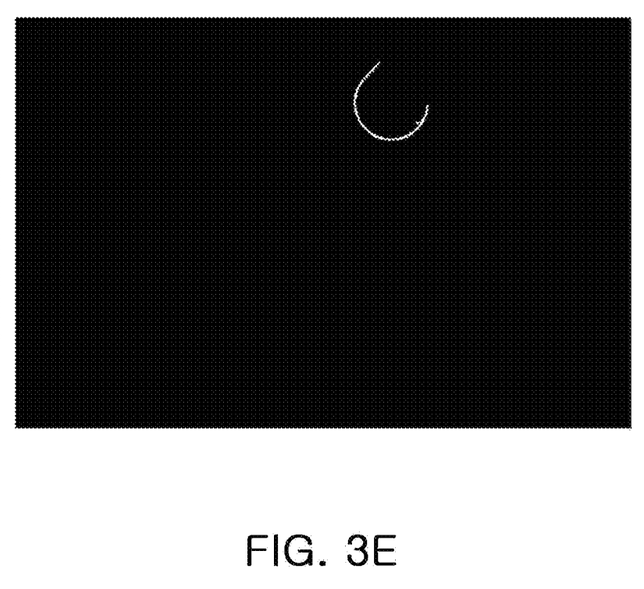

FIG. 3E shows the results of performing the removal of the shape connected to the edge portion of the image shown in S160 of FIG. 1, from the results of extracting the long, narrow shape.

In FIG. 3E, it can be seen that only the crack that occurred at the periphery of the solder ball is expressed in white, by way of removing the shape connected to the edge portion.

Although FIGS. 3A to 3E illustrate the example of detecting a crack that has occurred in the periphery of the solder ball according to an example embodiment, the range of application of the present inventive concept is not necessarily limited thereto.

For example, the detecting method according to an example embodiment may be applied to the results of all processes in which a crack may occur in semiconductor manufacturing processes.

In addition, the detecting method according to an example embodiment may be applied to detect, not only a crack that has occurred in the semiconductor chip, but also foreign objects attached to the semiconductor chip.

Figure 4:
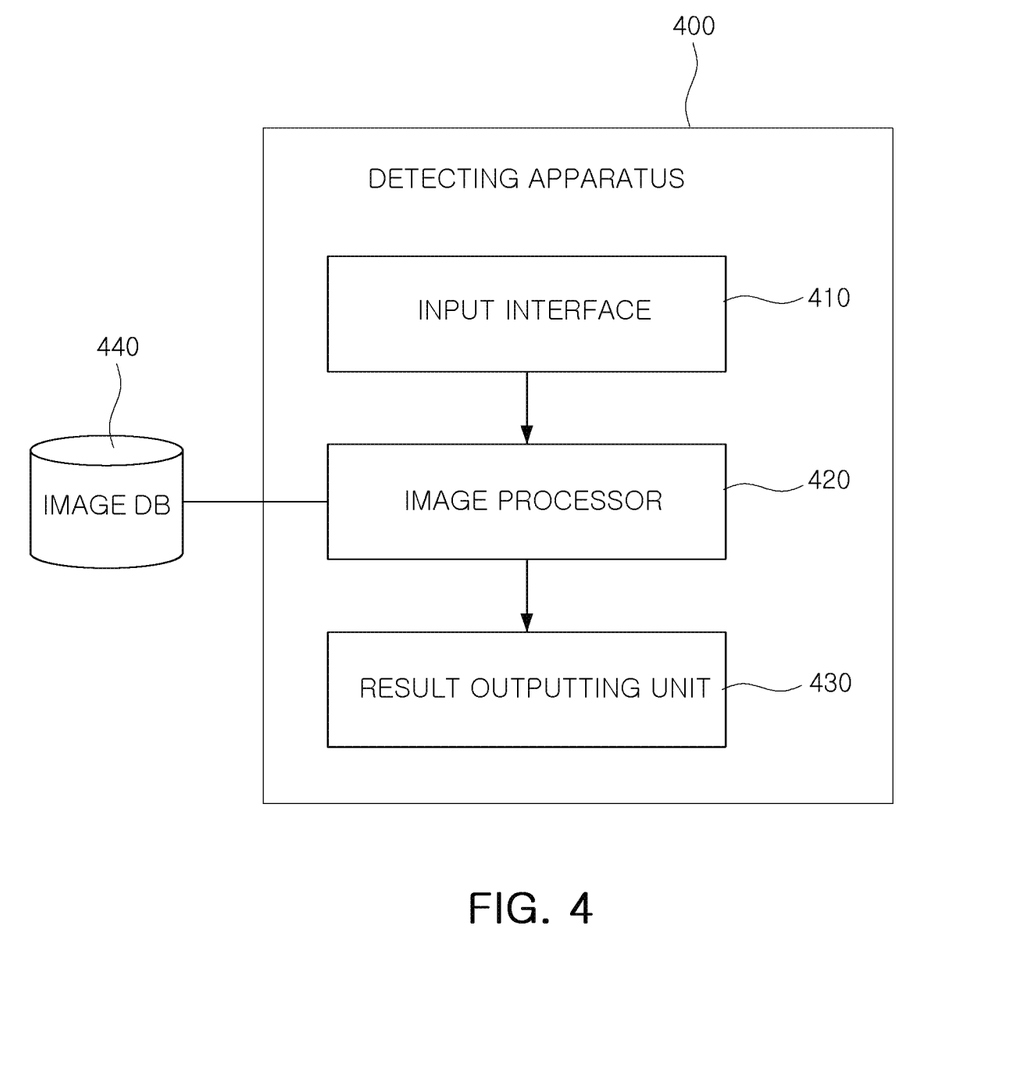
FIG. 4 is a block diagram of a detecting apparatus according to an example embodiment of the present inventive concept.

FIG. 4 is a block diagram of a detecting apparatus according to an example embodiment.

Referring to FIG. 4, a detecting apparatus 400 according to an example embodiment may include an input interface 410, an image processor 420, and a result outputting unit 430.

The input interface 410 may receive a set value required for image processing in the image processor 420 to be described later.

For example, a set value for image binarization, an area for removing noise, a set value and range to extract a long, narrow shape, or the like may be input through the input interface 410.

According to example embodiments, the input interface 410 may include at least one input device, such as a keypad, a touch screen, etc. The image processor 420 may perform various computing functions such as executing specific software for performing specific calculations or tasks associated with crack detection. For example, the image processor 420 may be a microprocessor, a central processor unit (CPU), a digital signal processor, or the like. In some embodiments, the image processor 420 may include a single core or multiple cores. For example, the image processor 420 may be a multi-core processor, such as a dual-core processor, a quad-core processor, a hexa-core processor, etc. Although FIG. 4 illustrates the detecting apparatus 400 including one image processor 420, in some embodiments, the detecting apparatus 400 may include a plurality of processors. According to example embodiments, the image processor 420 may include an internal or external cache memory.

The set value for image binarization may have a value between 0 and 1, for example, as a threshold value used to convert the image into the binary image, based on the numerical value obtained by quantifying a degree of color change in the image. As the set value is closer to 1, only a portion of the image in which the color rapidly changes may be expressed on the binary image. On the other hand, as the set value is closer to 0, a portion of the image in which the color gradually changes may also be expressed on the binary image. According to an example embodiment, the set value for image binarization may be set to 0.1 by default, and may be adjusted according to the input through the input interface 410.

In addition, an area value for noise removal is a value used to remove a meaningless portion, for example, small shapes, expressed on a binary image, and the area value may also indicate the number of pixels constituting an arbitrary shape. In this case, the area occupied by the shape represented on the binary image, for example, the shapes, in the case that the number of pixels is smaller than the set number of pixels, may be regarded as noise, and may thus be removed.

In addition, a set value to extract a long, narrow shape is a value used to extract a shape having a relatively long length compared to a width, using a length/width ratio of the remaining shapes in the binary image. As the value further increases, only shapes having a relatively long length compared to the width may be extracted. Also, the set range represents upper and lower limit values of the width of the remaining shape in the binary image, and the upper and lower limit values may be set in a pixel unit.

An area value to remove noise, having a pixel unit, and a set range to extract a long, narrow shape (i.e., the width range), among the set values described above, may be appropriately set in consideration of the size of a crack or foreign objects in the image. For example, the area value and the set range may be set to be relatively large for the image in which the objects are enlarged, and the area value and the set range may be set to be relatively small for the image in which the objects are reduced.

The image processor 420 may detect a crack, foreign objects, or the like on a semiconductor chip through image processing of at least one image stored in an image database (DB) 440.

A method of detecting a crack or the like on the semiconductor chip by the image processor 420 is the same as that described above with reference to FIG. 1, and a detailed description thereof will thus be omitted.

Although FIG. 4 illustrates that the image processor 420 receives an image stored in the image database 440, the present inventive concept is not limited thereto.

For example, the image processor 420 may receive an image obtained in real time from an image acquisition unit (not shown) to image a semiconductor chip to be detected, and may also detect a crack, foreign objects, or the like on the semiconductor chip through image processing.

According to example embodiments of the inventive concept, the method as described above improves conventional crack detection methods by reducing detection time and improving accuracy. For example, conventional techniques for detecting crack(s) in a semiconductor chip by measuring conductivity may be time-consuming and may be difficult to automate. In addition, conventional methods for detecting crack(s) through image processing may require a process of as many as thirteen (13) steps, and may require a neural network for crack readout, and, therefore, may be time-consuming and it may be difficult to obtain accurate results therefrom due to requirements of setting many input values to obtain detection results.

Contrary to conventional crack detection techniques, according to example embodiments of the inventive concept as described above only nine (9) or fewer steps of image processing may be performed to detect presence or absence of crack(s) in a semiconductor chip, and only up to 5 input variables would need to be set by a user. A classifier such as a neural network may not be required for crack readout. For example, as illustrated in FIGS. 1 and 2, the inventive concept according to exemplary embodiments includes the steps of performing image gradient analysis (S110), performing image binarization (S120), filling closed region (S130), removing noise (S140), extracting long, narrow shape (S150) and removing shape connected to edge portion of image (S160). The step of removing shape connected to edge portion of image (S160), according to the exemplary embodiments of the inventive concept includes the steps of adding an edge line to objects connected to an edge portion of image (S161), filling closed regions (S162) and extracting long, narrow shapes (S163). Thus, the crack(s) detection process by utilizing the imaging processing steps of the inventive concept according to exemplary embodiments use simple calculation processes (9 steps) compared to conventional techniques that require as many as 13 steps. In addition, in the method disclosed above with respect to the exemplary embodiments of the inventive concept, the set value for image binarization may have a value between 0 and 1 (e.g., not more than five input values). Thus, requirements of setting many input values (e.g., more than five input values) to obtain detection results according to conventional techniques are not necessary according to the exemplary embodiments of the inventive concept as disclosed above. Thus, the crack(s) detection method according to the exemplary embodiments of the inventive concept may reduce the influence of user input on the accuracy of detection results compared to the conventional crack(s) detection methods.

A result outputting unit 430 is configured to output results detected by the image processor 420, for example, to output the detection results through a display device.

According to an example embodiment, the result outputting unit 430 may output resulting image processed by the image processor 420, for example, resulting image in which only a portion of a crack is expressed in white.

According to another example embodiment, the result outputting unit 430 may output detection results for each of input images, i.e., presence or absence of a crack, or output detecting position of a crack together, when a crack is detected. When the result outputting unit 430 outputs detection results indicating absence of a crack in the semiconductor chip, the semiconductor chip may be implemented/installed to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc. When the result outputting unit 430 outputs detection results indicating presence of a crack in the semiconductor chip, the semiconductor chip may not be implemented/installed to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc. When the result outputting unit 430 outputs detection results indicating a crack position in the semiconductor chip, the semiconductor chip may still be utilized by electrically isolating only the crack position of the semiconductor chip.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

As set forth above, according to an example embodiment, a detecting method, a detecting apparatus, and a non-transitory computer readable storage medium, which are capable of detecting a crack that has occurred in or foreign objects attached to a semiconductor chip in a semiconductor manufacturing process, may be provided.

While example embodiments have been shown and described above, it will be apparent to those skilled in the art that modifications and variations could be made without departing from the scope of the present invention as defined by the appended claims.

What is claimed is:

1. A detecting apparatus comprising:
an image processor configured to detect a crack in a semiconductor chip through image processing of an input image of the semiconductor chip, and
a result outputting unit configured to output results detected by the image processor,
wherein the image processor is configured to perform an image gradient analysis on the input image, to convert the input image into a binary image by image binarization, based on a result obtained by performing the image gradient, to fill a closed region in the binary image with the same color as a color representing an outline of a shape appearing in the binary image that forms the closed region, to extract a shape having a predetermined property from the binary image, and to detect the crack by removing a shape connected to an edge portion of the input image.

2. The detecting apparatus according to claim 1, wherein the image processor is configured to further perform an operation of removing noise from the binary image.

3. The detecting apparatus according to claim 2, wherein the image processor is configured to perform the image processing, using a predetermined value, depending on a condition of the input image or an object to be detected.

4. The detecting apparatus according to claim 2, further comprising an input interface configured to receive a set value used for the image processing.

5. The detecting apparatus according to claim 4, wherein the detecting apparatus is configured to receive at least one of a set value for the image binarization, an area value for noise removal, a set value for extraction of the shape having the predetermined property, and a set range for extraction of the shape having the predetermined property, through the input interface.

6. The detecting apparatus according to claim 1, wherein the image processor is configured to receive the input image from an image database configured to store an image of the semiconductor chip, or from an image acquisition unit configured to image the semiconductor chip.

7. The detecting apparatus according to claim 1, wherein the result outputting unit is configured to output the resulting image onto a display device in which only the crack portion is expressed in the input image.

8. The detecting apparatus according to claim 1, wherein the result outputting unit is configured output at least one of a presence or absence and a position of the crack in the input image onto a display device.

9. The detecting apparatus according to claim 1, wherein the predetermined shape has a length greater than a width of the shape.

10. A detecting method performed by an image processor to detect a crack in a semiconductor chip, the method comprising:
performing an image gradient analysis on an input image of the semiconductor chip;

converting the input image into a binary image by image binarization, based on results of the image gradient;

filling a closed region in the binary image with the same color as a color representing an outline of a shape appearing in the binary image that forms the closed region;

extracting a shape having a predetermined property from the binary image; and removing a shape connected to an edge portion of the input image.

11. The detecting method according to claim 10, wherein the performing of the image gradient analysis includes expressing numerical values obtained by quantifying a degree of color change in the input image.

12. The detecting method according to claim 11, wherein the converting of the input image into the binary image is performed to convert the input image into the binary image by results of comparing the quantified numerical values with a predetermined value.

13. The detecting method according to claim 12, wherein the converting of the input image into the binary image is performed to express the binary image in white when the quantified numerical value is equal to or greater than the predetermined value, and in black when the quantified numerical value is less than the predetermined value.

14. The detecting method according to claim 12, wherein the predetermined value is set to be a value between 0 and 1.

15. The detecting method according to claim 10, further comprising removing noise from the binary image.

16. The detecting method according to claim 15, wherein the removing of noise is performed to remove a shape having an area smaller than a predetermined area in the binary image.

17. The detecting method according to claim 10, wherein the extracting of the shape having the predetermined property from the binary image is performed by extracting a shape having a length longer than a width of the shape.

18. The detecting method according to claim 17, wherein the extracting of the shape having the predetermined property from the binary image is performed by obtaining a length and a width of each shape appearing on the binary image, and by extracting a shape of which a length/width ratio is equal to or greater than a predetermined value, and of which the width is included in a predetermined range.

19. The detecting method according to claim 10, wherein the removing of the shape connected to the edge portion of the input image comprises:

adding an edge line to the shape connected to the edge portion of the image, filling a closed region in the binary image, and extracting the shape having the predetermined property from the binary image.

20. A non-transitory computer readable storage medium, recorded with instructions executable by a processor to perform a detecting method to detect a crack in a semiconductor chip, the method comprising:

performing an image gradient analysis on an input image of a semiconductor chip;

converting the input image into a binary image by image binarization, based on results of the image gradient;

filling a closed region in the binary image with the same color as a color representing an outline of a shape appearing in the binary image that forms the closed region;

extracting a shape having a predetermined property from the binary image; and removing a shape connected to an edge portion of the input image.

* * * * *